United States Patent
Suzuki

(10) Patent No.: US 8,472,062 B2
(45) Date of Patent: Jun. 25, 2013

(54) INFORMATION PROCESSING APPARATUS AND METHOD OF CONTROLLING THE SAME

(75) Inventor: Ryousuke Suzuki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 20 days.

(21) Appl. No.: 13/389,742

(22) PCT Filed: Dec. 2, 2011

(86) PCT No.: PCT/JP2011/078495
§ 371 (c)(1),
(2), (4) Date: Feb. 9, 2012

(87) PCT Pub. No.: WO2012/081505
PCT Pub. Date: Jun. 21, 2012

(65) Prior Publication Data
US 2012/0206766 A1   Aug. 16, 2012

(30) Foreign Application Priority Data

Dec. 16, 2010 (JP) .................................. 2010-281016
Nov. 29, 2011 (JP) .................................. 2011-261010

(51) Int. Cl.
*G06F 3/12* (2006.01)

(52) U.S. Cl.
USPC ........................................ 358/1.15; 358/1.18

(58) Field of Classification Search
None
See application file for complete search history.

(56) References Cited

U.S. PATENT DOCUMENTS

| 2006/0171734 A1 | 8/2006 | Maeda |
| 2007/0176898 A1 | 8/2007 | Suh |
| 2009/0128484 A1* | 5/2009 | Hanyu .......................... 345/156 |

FOREIGN PATENT DOCUMENTS

| JP | 11-254758 A | 9/1999 |
| JP | 2001-067201 A | 3/2001 |
| JP | 2003-256129 A | 9/2003 |
| JP | 2006-209011 A | 8/2006 |
| JP | 2007-207228 A | 8/2007 |
| JP | 2007-320053 A | 12/2007 |
| JP | 2009-073064 A | 4/2009 |

OTHER PUBLICATIONS

Japan Patent Office, International Search Report dated Feb. 21, 2012, in connection with International Application No. PCT/JP2011/078495, 3 pages.

Japan Patent Office, Written Opinion of the International Search Authority dated Feb. 21, 2012, in connection with International Application No. PCT/JP2011/078495, 4 pages.

* cited by examiner

*Primary Examiner* — Dov Popovici

(74) *Attorney, Agent, or Firm* — Fitzpatrick, Cella, Harper & Scinto

(57) ABSTRACT

Document data to be printed is decided from document data of a plurality of pages, based on an inclination of an information processing apparatus detected by a sensor for detecting the inclination of the information processing apparatus. The decided document data to be printed is transmitted to a printing apparatus in accordance with an instruction to transmit the document data to be printed to the printing apparatus.

7 Claims, 13 Drawing Sheets

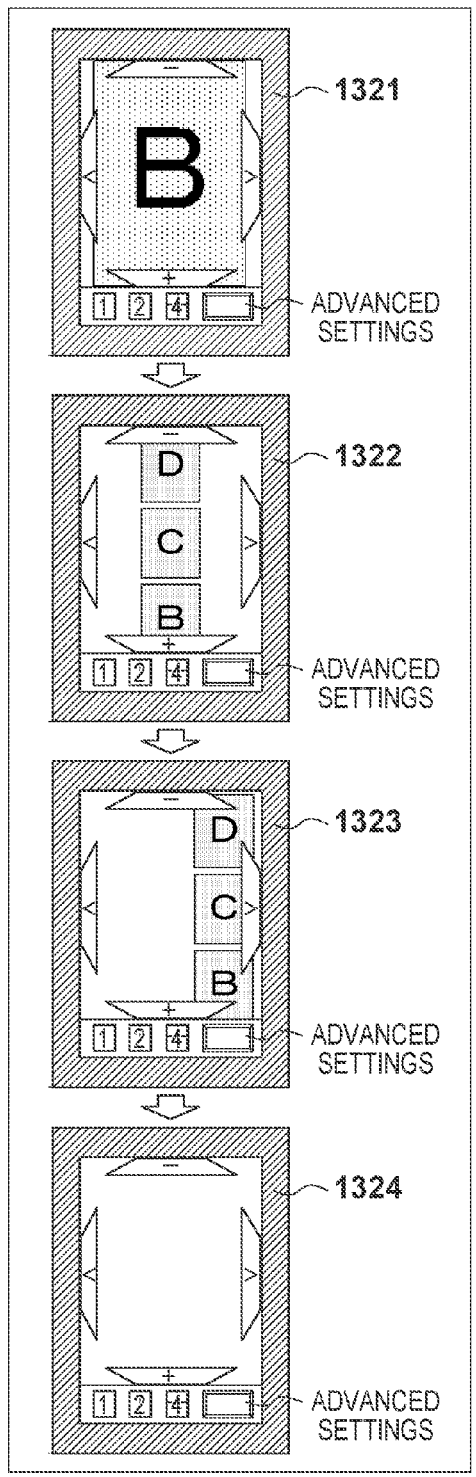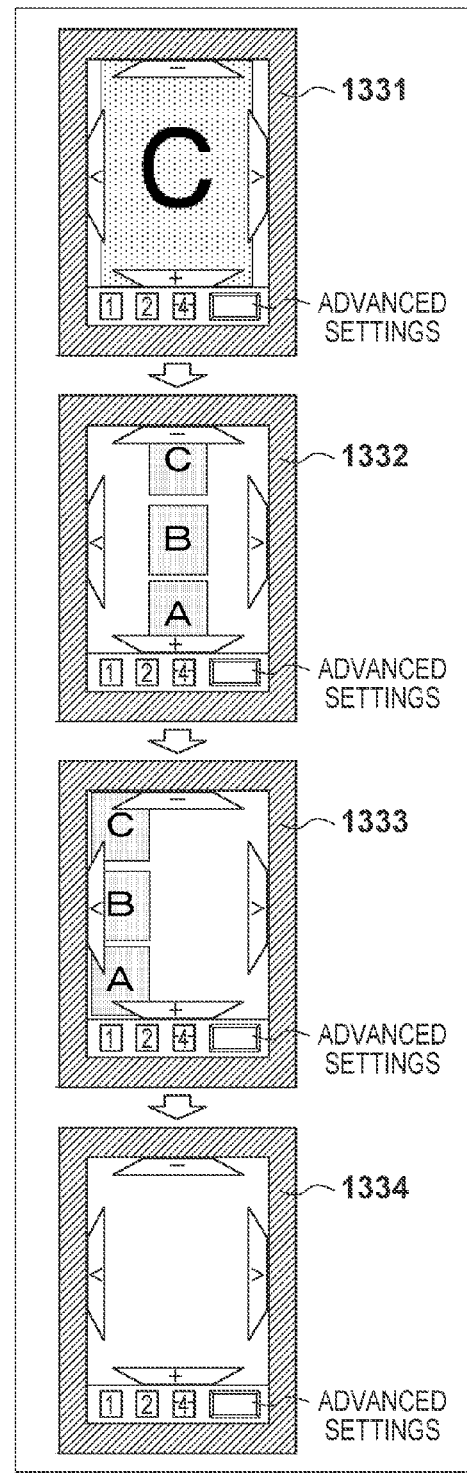

INFORMATION PROCESSING APPARATUS AND METHOD OF CONTROLLING THE SAME

TECHNICAL FIELD

The present invention relates to an information processing apparatus and method of controlling the information processing apparatus.

BACKGROUND ART

Conventionally, an image forming apparatus typically has an input display panel (hereinafter referred to as an operation panel) which is connected thereto and integrated therewith. There is also a printing apparatus having a console unit which is detachably attached to the main body thereof (for example, Japanese Patent Laid-Open No. 2001-67201). In a printing apparatus which includes a reader unit and an engine unit in the main body thereof, the operation panel may be detachably attached to the main body and send an operate instruction to the reader unit and the engine unit separately. In recent years, there has been a compact computer device which includes a three-dimensional acceleration sensor or the like, and uses the sensor to detect an inclination of the device and changes the orientation of a document or an image displayed on a display unit of the computer device, depending on the inclination of the device.

In the aforementioned image forming apparatus having the removable operation panel, the user can change various settings while carrying the operation panel which has been removed from the main body. However, the operation panel can only be removed from the main body and operated. There is a desire to improve the operability by utilizing the portability of the operation panel.

In the compact computer device including the three-dimensional acceleration sensor, the display orientation is only changed using the output of the sensor. For example, the computer device provides a print instruction to a printer in a manner similar to that of conventional computer devices.

SUMMARY OF INVENTION

An aspect of the present invention is to eliminate the above-mentioned problems in the conventional technology.

A feature of the present invention is to provide a technique of improving operability when an information processing apparatus capable of detecting an inclination provides a print instruction to a printing apparatus.

According to an aspect of the present invention, there is provided an information processing apparatus for transmitting a print job to a printing apparatus, comprising: display means for displaying document data; detection means for detecting an inclination of the information processing apparatus; instruction means for providing an instruction to transmit document data to be printed to the printing apparatus; decision means for deciding the document data to be printed from document data of a plurality of pages, based on the inclination of the information processing apparatus detected by the detection means; and transmission means for transmitting to the printing apparatus the document data to be printed decided by the decision means, in response to the instruction provided by the instruction means.

According to another aspect of the present invention, there is provided a method for controlling an information processing apparatus which includes a display unit for displaying document data and transmits a print job to a printing apparatus, comprising: a detection step of detecting an inclination of the information processing apparatus; an instruction step of providing an instruction to transmit document data to be printed to the printing apparatus; a decision step of deciding the document data to be printed from document data of a plurality of pages, based on the inclination of the information processing apparatus detected in the detection step; and a transmission step of transmitting to the printing apparatus the document data to be printed decided in the decision step, in response to the instruction provided in the instruction step.

Further features and aspects of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 13A to 13D are diagrams for describing example changing of display, depending on an inclination of the operation panel.

DESCRIPTION OF EMBODIMENTS

Embodiments of the present invention are described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

It should be noted that, in embodiments described herein, an operation panel is described as an example of an information processing apparatus, but the present invention is not limited to this.

Figure 1:
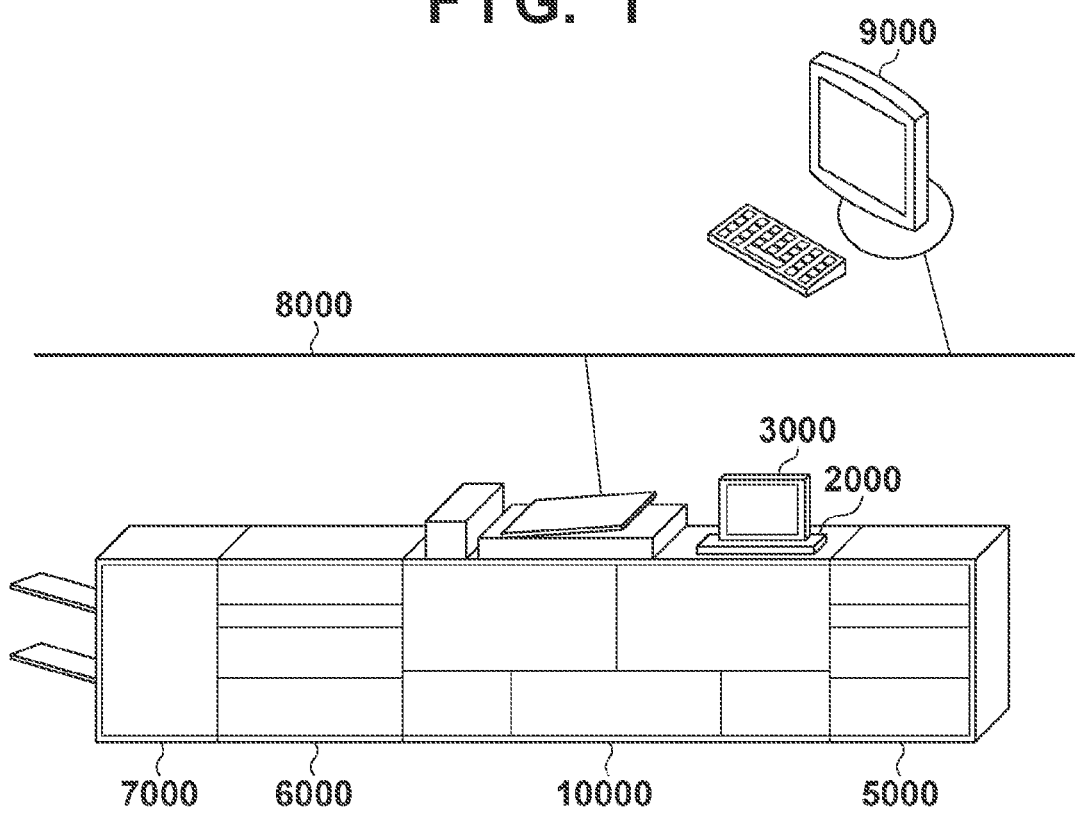
FIG. 1 is a schematic diagram showing an environment in which an image forming apparatus according to an embodiment of the present invention is used.

FIG. 1 is a schematic diagram showing an environment in which an image forming apparatus according to an embodiment of the present invention is used.

The image forming apparatus (printing apparatus) is a so-called print-on-demand (POD) apparatus, which can meet requests for various printing and bookbinding styles etc. by combining various options, such as saddle stitching, cutting, a folding process, and the like.

FIG. 1 shows an example in which the image forming apparatus includes an image forming apparatus main body 10000 in combination with a paper feed deck 5000, a binder 6000, and a finisher 7000. The main body 10000 is connected via an LAN 8000 to a personal computer (PC) 9000. The personal computer 9000 creates or edits each page of document data, and generates a print job containing settings for bookbinding, cutting, folding process, etc. The print job thus generated is sent via the LAN 8000 to the main body 10000 of the image forming apparatus and then printed. Note that, in this embodiment, document data means data containing not only text data but also image data, such as a photograph, a graph, etc.

In FIG. 1, a removable operation panel 3000 which is a feature of this embodiment is attached to a home position 2000 provided on the main body 10000. The removable operation panel 3000 includes a display unit 3200 (FIG. 2), and incorporates a rechargeable battery 3211 (FIG. 2) which allows the operation panel 3000 to operate while being detached from the main body 10000. When the operation panel 3000 is attached to the home position 2000, the rechargeable battery is charged by power supplied from the home position 2000.

Note that the details of the options, such as the paper feed deck 5000, the binder 6000, the finisher 7000, and the like, will not be described, since they do not directly relate to the present invention.

Figure 2:
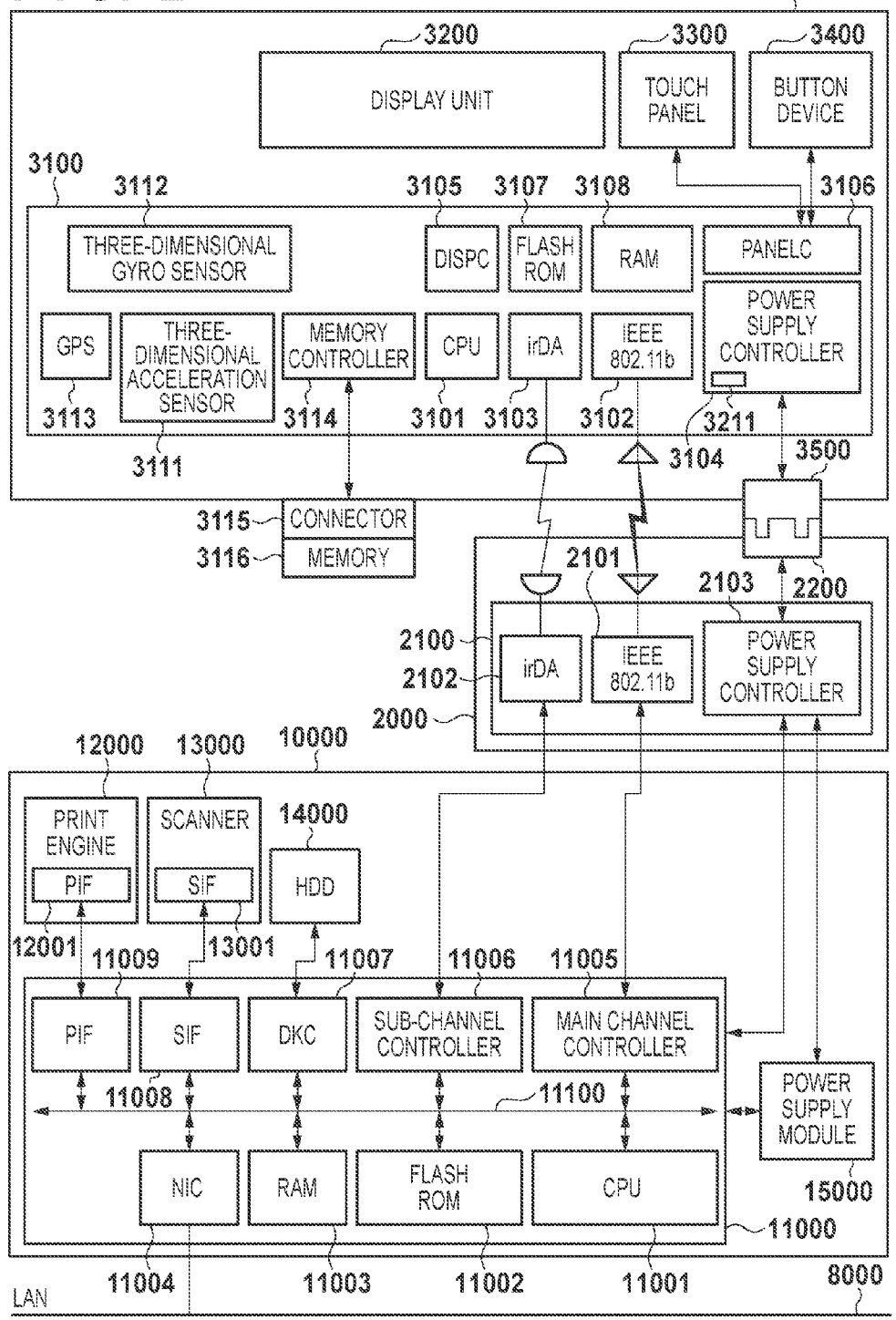
FIG. 2 is a block diagram showing a control configuration of the main body of an image forming apparatus, a home position, and an operation panel according to an embodiment.

FIG. 2 is a block diagram showing a control configuration of the main body 10000 of the image forming apparatus, the home position 2000, and the operation panel 3000 of this embodiment. A configuration of each of the main body 10000, the home position 2000, and the operation panel 3000 will be described hereinafter. Firstly, the main body 10000 will be described.

As shown in FIG. 2, the main body 10000 includes a controller board 11000, a print engine 12000, a scanner 13000, a hard disk drive (HDD) 14000, and a power supply module 15000. Each part is driven by power supplied from the power supply module 15000.

The controller board 11000 includes a CPU 11001, a flash ROM 11002, a RAM 11003, a network interface card (NIC) 11004, a main channel controller 11005, and a sub-channel controller 11006. The controller board 11000 further includes a disk controller (DKC) 11007, a scanner interface (SIF) 11008, and a printer interface (PIF) 11009. The devices 11001-11009 are connected via a bus 11100 to the CPU 11001.

The CPU 11001 is a processor which comprehensively controls the devices connected to the bus 11100, and executes control programs stored in the flash ROM 11002 or the HDD 14000. The RAM 11003 is used as a main memory and a work area for the CPU 11001. The NIC 11004 bidirectionally exchanges data with the personal computer 9000 or another image forming apparatus via the LAN 8000. The HDD 14000, which is accessed via the DKC 11007, not only stores a control program, but also temporarily stores image data.

The scanner 13000 includes a reading sensor, a document feed mechanism, and the like (all not shown). The reading sensor, the document feed mechanism, and the like are controlled by software executed by the CPU 11001 via the SIF 11008 provided in the controller board 11000 and the SIF 13001 provided in the scanner 13000. As a result, the reading sensor reads a document, and transfers the obtained data via the SIF 13001 and the SIF 11008 to the controller board 11000.

The print engine 12000 includes an electrophotographic type print unit, a paper cassette, a paper conveyance unit, and the like (all not shown). The controller board 11000 sends a print request based on a print job via the PIF 11009 and a PIF 12001 which is provided in the print engine 12000. Similarly, the print unit, the paper conveyance unit, and the like are controlled via the PIF 11009 and the PIF 12001 based on a program executed by the CPU 11001. As a result, an image corresponding to the print request is formed on paper.

The main channel controller 11005 and the sub-channel controller 11006 are used when the main body 10000 and the removable operation panel 3000 communicate with each other. Details thereof will be described below.

Next, the home position 2000 will be described.

As shown in FIG. 2, the home position 2000 mainly includes a main board 2100 and a connector 2200. The main board 2100 mainly includes an IEEE802.11b module 2101, an irDA module 2102, and a power supply controller 2103. The IEEE802.11b module 2101 is connected to the main channel controller 11005 of the controller board 11000, and mediates wireless communication between the controller board 11000 and the operation panel 3000 based on a request from the controller board 11000. The irDA module 2102 is connected to the sub-channel controller 11006 of the controller board 11000, and mediates infrared communication between the controller board 11000 and the operation panel 3000 based on a request from the controller board 11000. The power supply controller 2103 is connected to the power supply module 15000. The IEEE802.11b module 2101 and the irDA module 2102 receive power supplied via the power supply controller 2103. The power supply controller 2103 is also connected to the connector 2200, and supplies power to the operation panel 3000 as well when a connector 3500 of the operation panel 3000 is in contact with the connector 2200. In addition, the power supply controller 2103 monitors the supply of power to detect whether or not the operation panel 3000 is attached to the home position 2000, and transmits the detection result to the controller board 11000.

Next, the operation panel 3000 will be described.

The removable operation panel 3000 mainly includes a main board 3100, a display unit (LCD) 3200, a touch panel 3300, a button device 3400, and the connector 3500. The main board 3100 includes a CPU 3101, an IEEE802.11b module 3102, an irDA module 3103, and a power supply controller 3104. The operation panel 3000 also includes a display controller (DISPC) 3105, a panel controller (PANELC) 3106, a flash ROM 3107, and a RAM 3108. The modules 3101-3108 are connected via a bus (not shown), similar to the controller board 11000.

The CPU 3101 is a processor which comprehensively controls the devices connected to the bus, and executes a control program stored in the flash ROM 3107. The RAM 3108 functions as a main memory and a work area for the CPU 3101, and an area for storing video data which is displayed on the display unit 3200. The CPU 3101 can recognize an orientation and a motion of the operation panel 3000 using a three-dimensional acceleration sensor 3111 and a three-dimensional gyro sensor 3112. The three-dimensional acceleration sensor 3111 has a movable portion in a semiconductor chip. A fin of the movable portion is moved by externally applied acceleration, so that a space between the fin of the movable portion and a fin of a non-movable portion is changed, resulting in a change in capacitance. As a result, the acceleration externally applied to the operation panel 3000 can be detected. The three-dimensional gyro sensor 3112 is a semiconductor device which utilizes Coriolis force. By performing signal processing on the outputs of these two sensors 3111 and 3112, taking the influence of gravity into consideration, it can be accurately detected whether the operation panel 3000 is in a vertical (for example, upright) position or in a horizontal (for example, laid down) position, or whether the operation panel 3000 is in a portrait orientation or in a landscape orientation. Moreover, a three-dimensional motion and location of the operation panel 3000 can be accurately detected in to and fro directions, left and right directions, and up and down directions, for example.

Note that there are other known types of the three-dimensional acceleration sensor 3111: piezoresistive type; thermo detection type; and the like. The present invention can be carried out using any known type of acceleration sensor.

The CPU 3101 can recognize a current location of the operation panel 3000 using a GPS 3113. GPS means a technique of determining a position using the Global Positioning System. Techniques of detecting the orientation and attitude of a device using the above sensors are known. In the present invention, all of these techniques can be implemented in the operation panel 3000, and therefore, a more detailed description thereof will not be given.

The display controller (DISPC) 3105 transfers video data held in the RAM 3108 to the display unit 3200 in response to a request from the CPU 3101, and controls the display unit 3200 so that the display unit 3200 displays the video data. The panel controller (PANELC) 3106 controls the touch panel 3300 and the button device 3400 in response to a request from the CPU 3101. By the control, a pressed position on the touch panel 3300, a key code corresponding to a button pressed down on the button device 3400 by a user, and the like are transmitted back to the CPU 3101. A memory controller 3114 is controlled by the CPU 3101 to access an external memory 3116, such as an SD memory or the like, via an external memory connector 3115, and read data from the external memory 3116. The data thus read can be displayed via the DISPC 3105 on the display unit 3200. The DISPC 3105 can also transmit and receive data to and from the main body 10000 via the CPU 3101 and the IEEE802.11b 3102.

The power supply controller 3104 is connected to the connector 3500, and when the connector 2200 of the home position 2000 and the connector 3500 are connected to each other, receives power supplied from the power supply module 15000 of the main body 10000. As a result, electric power is supplied to the entire operation panel 3000 while the rechargeable battery 3211 connected to the power supply controller 3104 is charged. If electric power is not supplied from the power supply module 15000, the rechargeable battery 3211 supplies power to the entire operation panel 3000.

The CPU 3101 controls the IEEE802.11b module 3102 so that the IEEE802.11b module 3102 establishes wireless communication with the IEEE802.11b module 2101 on the home position 2000, and the IEEE802.11b module 2101 mediates communication between the operation panel 3000 and the main body 10000. The CPU 3101 controls the irDA module 3103 so that the irDA module 3103 establishes infrared communication with the irDA module 2102 on the home position 2000, and the irDA module 2102 mediates communication between the operation panel 3000 and the main body 10000.

Next, wireless communication as a main channel according to this embodiment will be described.

As briefly mentioned above with reference to FIG. 2, in this embodiment, wireless communication as a main channel is performed in accordance with the IEEE802.11b standard, which is a known technique. More specifically, in the system of this embodiment, wireless communication is performed in an infrastructure mode in which the main body 10000 is an access point (AP) and the operation panel 3000 is a terminal.

As described above, in the system of this embodiment, wireless communication can be performed between the main body 10000 and the operation panel 3000.

Next, an operation of the operation panel 3000 of this embodiment will be described with reference to a flowchart shown in FIG. 3. The operation panel 3000 has two modes: a "browsing mode" (first operating mode); and a "transfer mode" (second operating mode). The "browsing mode" refers to a mode in which document data is browsed on the operation panel 3000. The "transfer mode" refers to a mode in which document data can be transmitted from the operation panel 3000 to the main body 10000. An operation in the "browsing mode" of the operation panel 3000 and an operation in the "transfer mode" of the operation panel 3000 will be described below.

Figure 3:
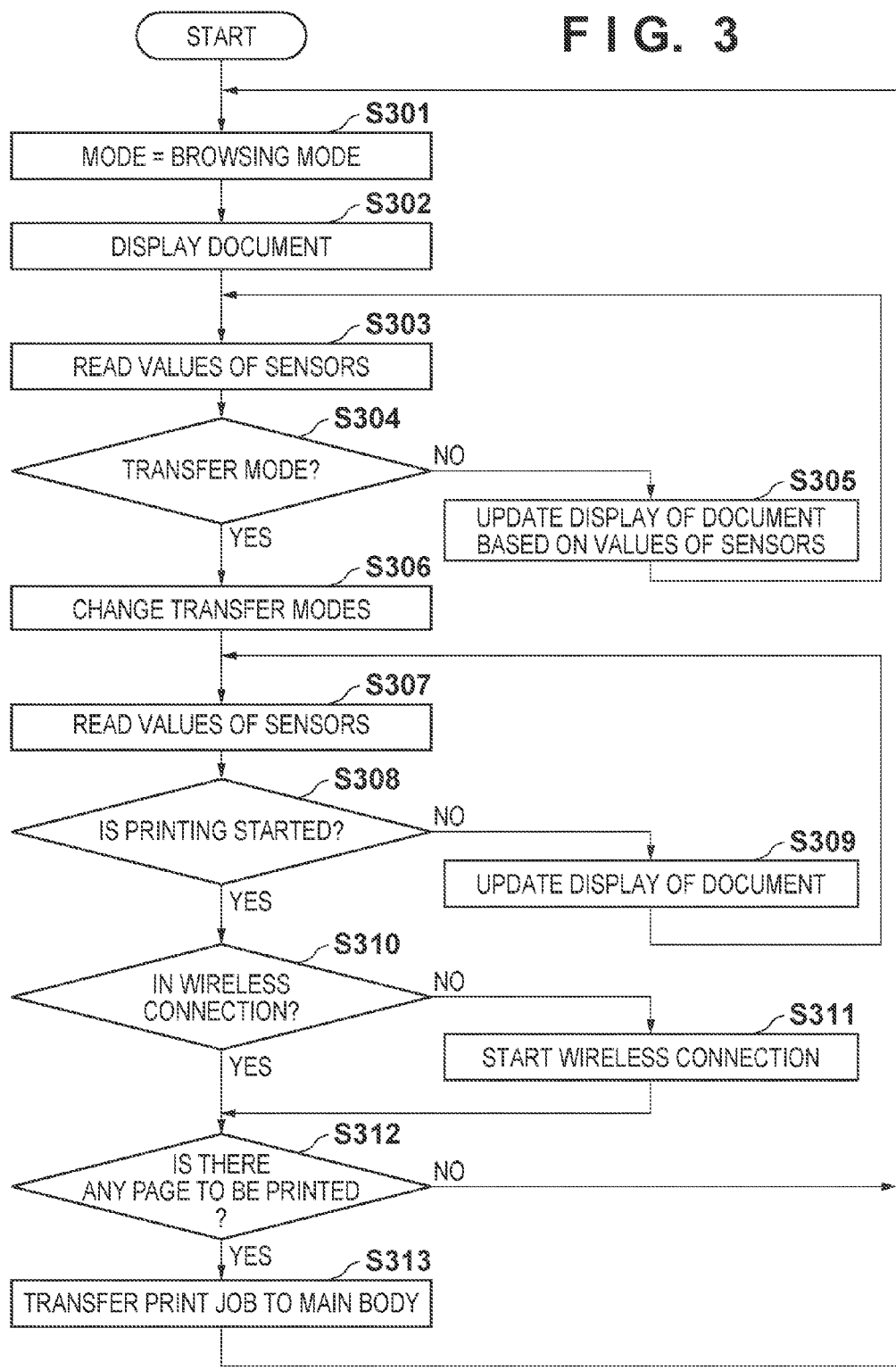
FIG. 3 is a flowchart for describing an operation of an operation panel according to a first embodiment.

FIG. 3 is a flowchart for describing an operation of the operation panel 3000 of this embodiment. A program for executing this process is stored in the flash ROM 3107, and is executed under control of the CPU 3101. Note that it is assumed that the operation panel 3000 of this embodiment can execute a program, such as a document creation application, browsing software, or the like, to, for example, create or obtain document data using the operation panel 3000. Note that details of the process of each step in FIG. 3 will be described below with reference to FIG. 4 and the following figures.

This process is started by turning the operation panel 3000 on. Initially, in step S301, the operation panel 3000 is activated into the "browsing mode." Next, the process proceeds to step S302, in which the operation panel 3000 causes the user to select document data which can be displayed, or displays document data which has already been selected on the display unit 3200. Here, the document data displayed (or to be displayed) is document data created by document creation software or document data on a web page, which is stored in the external memory 3116. The operation panel 3000 displays document data using browsing software. In this case, document data displayed on the display unit 3200 is preferably similar to what is actually printed out by performing a printing process based on the document data.

Next, the process proceeds to step S303, in which the CPU 3101 reads the outputs of the touch panel 3300, the button device 3400, the three-dimensional acceleration sensor 3111, and the three-dimensional gyro sensor 3112 of the operation panel 3000. A part of the read values of the sensors is stored into the RAM 3108. This is because not only the sensor values are individually used, but also changes in the sensor values are utilized. Next, the process proceeds to step S304, in which, based on the values read in step S303, the CPU 3101 determines whether to transition to the "transfer mode." The process of step S304 will be described in detail below. If the CPU 3101 determines not to transition to the "transfer mode," the process proceeds to step S305, in which the CPU 3101 updates display of document data which is being displayed on the display unit 3200, based on the output values of the sensors read in step S303. Thereafter, the process proceeds to step S303, in which the above process is repeated.

On the other hand, if in step S304 the CPU 3101 determines to transition to the "transfer mode," the process proceeds to step S306, in which the operation panel 3000 transitions to the "transfer mode." When the mode of the operation panel 3000 is switched to the "transfer mode," the operation panel 3000 changes what is displayed on the display unit 3200, or the behavior thereof with respect to the read values of the touch panel 3300, the button device 3400, the three-dimensional acceleration sensor 3111, and the three-dimensional gyro sensor 3112. Note that when the mode is switched, the values of the sensors stored in the RAM 3108 are cleared. An image which is being displayed when the mode is switched to the "transfer mode" is designated the first page or the final page of a page range to be printed.

Next, the process proceeds to step S307, in which, similar to step S303, the CPU 3101 reads the outputs of the touch panel 3300, the button device 3400, the three-dimensional acceleration sensor 3111, and the three-dimensional gyro sensor 3112. A part of the read values of the sensors is stored into the RAM 3108. This is because not only the sensor values are individually used, but also changes in the sensor values are utilized. Next, the process proceeds to step S308, in which, based on the values read in step S307, the CPU 3101 determines whether to transfer document data to the main body 10000 and cause the main body 10000 to start a printing process. The process of step S308 will be described in detail below. If, in step S308, the CPU 3101 determines not to cause the main body 10000 to start a printing process, the process proceeds to step S309, in which the CPU 3101 updates display of document data which is being displayed on the display unit 3200, based on the values of the sensors read in step S307. Thereafter, the process proceeds to step S307, in which the above process is repeated. Note that, in step S309, a page of the document data which is being displayed on the display unit 3200 is updated.

On the other hand, if in step S308 the CPU 3101 determines to cause the main body 10000 to start a printing process, an image which is being displayed on the display unit 3200 is excluded from a page range to be printed (that is, a page being displayed is not printed). Thereafter, in step S310, it is determined whether or not wireless connection has been established between the operation panel 3000 and the main body 10000. If wireless connection has not been established, the process proceeds to step S311, in which wireless connection is established, and proceeds to step S312. In step S312, the CPU 3101 determines whether or not a page(s) to be printed has been selected. If there is a page(s) to be printed, the process proceeds to step S313, in which the CPU 3101 creates a print job designating a page range to be printed, and transmits the generated print job to the main body 10000. Thereafter, the process proceeds to step S301. If in step S312 it is determined that a print job is to be transmitted to the main body 10000 or transfer of document data is to be started without a page to be printed being designated, the process proceeds to step S301, in which the operation panel 3000 returns to the "browsing mode."

Next, details of the process of each step described above will be described.

<Method of Updating Document Data in Document Browsing Mode>

A method of updating display of document data in the "browsing mode" in step S305 will be described.

When document data to be displayed is selected for the first time, the CPU 3101 rasterizes the selected document data, and displays a document image corresponding to the first page of the document data on the display unit 3200, depending on the attitude of the operation panel 3000.

Figure 4:
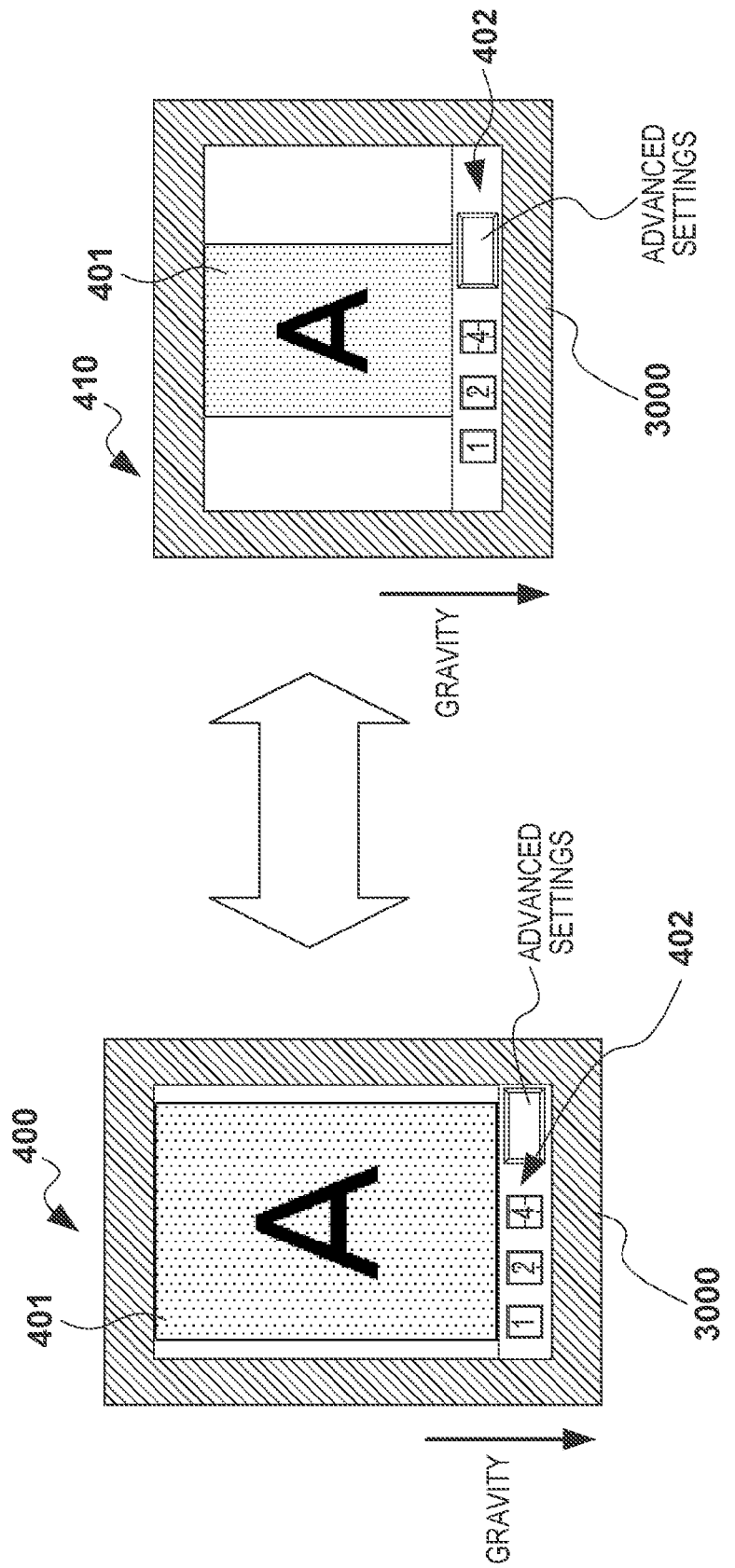
FIG. 4 is a diagram for describing display forms corresponding an orientation of the operation panel.

FIG. 4 is a diagram for describing orientation of the operation panel 3000, and display forms corresponding thereto.

Reference numeral 400 denotes a display form which is obtained when the operation panel 3000 is in a vertical orientation (portrait). Reference numeral 410 denotes a display form which is obtained when the operation panel 3000 is in a horizontal orientation (landscape). Reference numeral 401 denotes a displayed image, and reference numeral 402 denotes virtual buttons for changing a layout, print settings, and the like.

The orientation of the operation panel 3000 is detected by the three-dimensional gyro sensor 3112. When the operation panel 3000 is changed from the vertical orientation to the horizontal orientation or from the horizontal orientation to the vertical orientation, the display form is changed to that indicated by reference numeral 400 or 410 in FIG. 4.

The operation panel 3000 can also change pages of document data displayed on the display unit 3200, depending on the input to the touch panel 3300.

Figure 5:
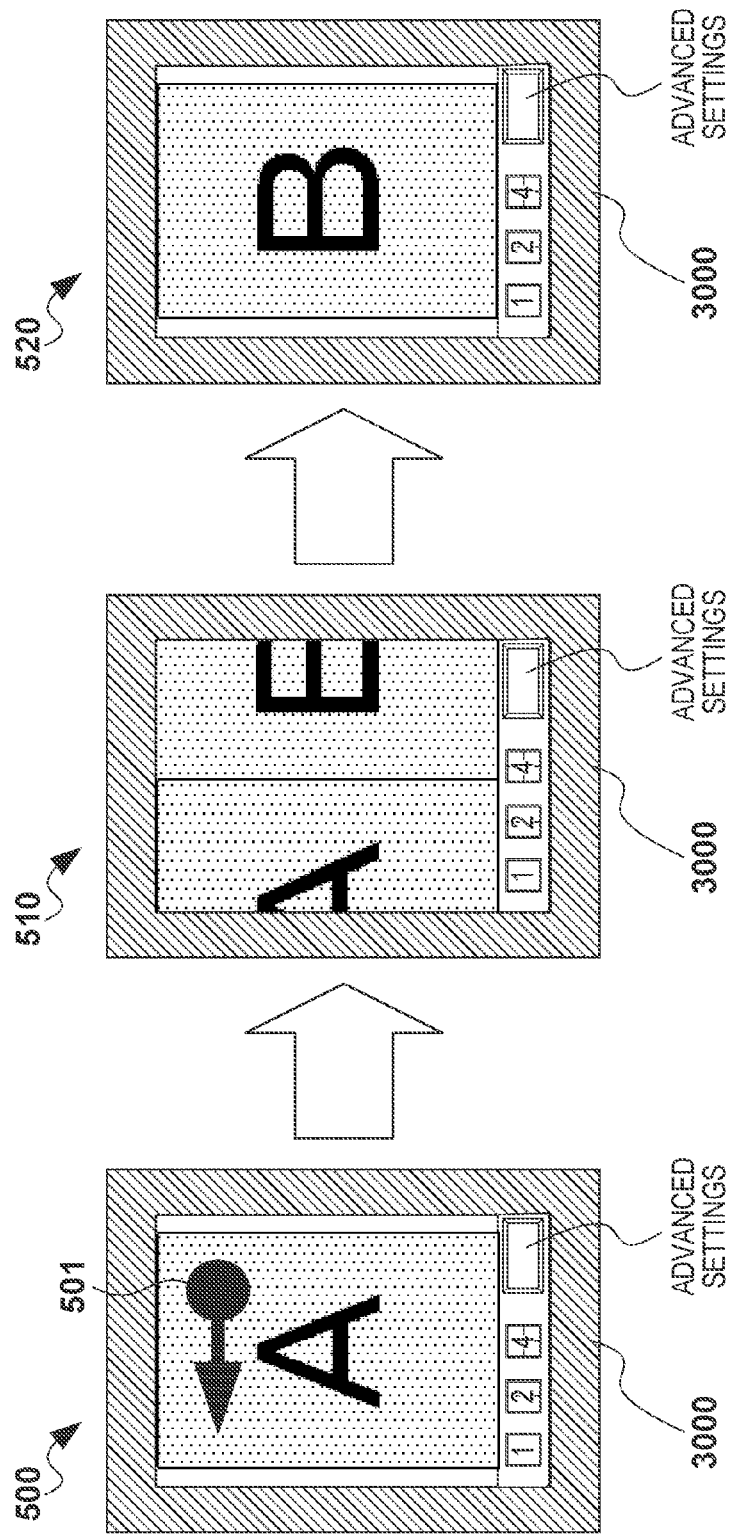
FIG. 5 is a diagram for describing display forms during changing of pages which are obtained when the operation panel is in a vertical orientation.

FIG. 5 is a diagram showing display forms during changing of pages which are obtained when the operation panel 3000 is in the vertical orientation.

Reference numeral 500 denotes a display form which is obtained when the operation panel 3000 is in the vertical orientation, similar to reference numeral 400 of FIG. 4. Here, when the user operates the touch panel 3300 using a finger as indicated by reference numeral 501, the operation panel 3000 updates the display so that a page being displayed (indicated by "A") is moved to the left of the screen in association with the user's operation. Note that reference numeral 501 represents how the user flips the screen to the left. The display is updated so that the next page (indicated by "B") is moved leftward from the right side of the screen as shown by a reference 510. Note that, in this embodiment, as indicated by the reference numeral 510 in FIG. 5, when the screen is flipped to the left using a finger, the next page is displayed, and when the screen is flipped to the right using a finger, the previous page is displayed. When an instruction to display a page which does not fall within the document data range is input (for example, the screen is flipped to the right using a finger when the first page is displayed, etc.), the display of the current page is maintained. Reference numeral 520 denotes a display form in which the next page (indicated by "B") has been completely displayed.

In addition, the operation panel 3000 can change display forms by, for example, enlarging a displayed image (spreading two fingers apart on the screen) or reducing a displayed image (pinching two fingers on the screen) in response to various input instructions to the touch panel 3300.

Figure 6:
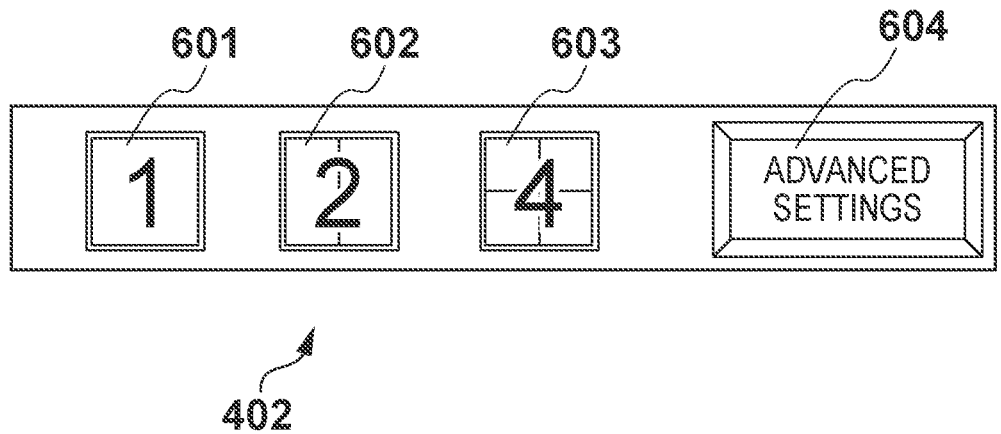
FIG. 6 depicts an enlarged view of buttons.

FIG. 6 depicts an enlarged view of the buttons 402.

Reference numeral 601 denotes a virtual button for instructing to print data corresponding to one page of document data onto one paper surface. Reference numeral 602 denotes a virtual button for instructing to print data corresponding to two pages of document data on one paper surface (2 in 1). Reference numeral 603 denotes a virtual button for instructing to print data corresponding to four pages of document data on one paper surface (4 in 1). Reference numeral 604 denotes a button for displaying a setting screen for providing further advanced print settings (for example, designating the number of copies, etc.).

Figure 7A:
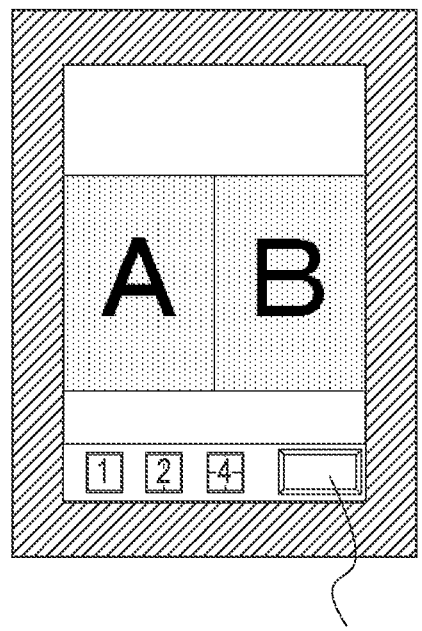
FIGS. 7A and 7B are diagrams for describing example displays of a plurality of pages when the operation panel is in the vertical orientation.
Figure 7B:
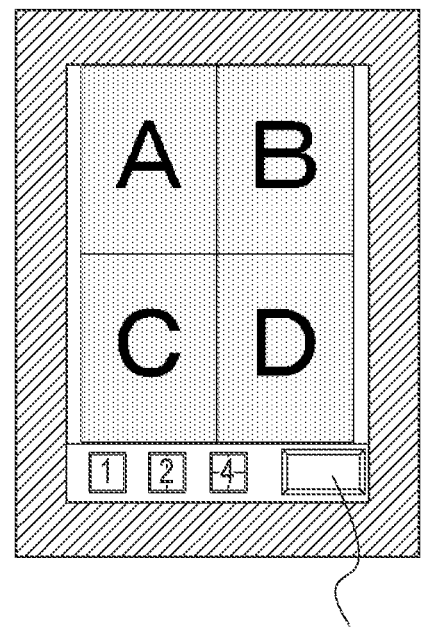

FIGS. 7A and 7B are diagrams for describing an example control of displaying a plurality of pages when the operation panel 3000 is in the vertical orientation.

The screen displayed on the display unit 3200 is changed based on the inputs of the virtual buttons 601-603. For example, when the button 602 is pressed down, as shown in FIG. 7A an image of two pages laid out on one paper is displayed. When the button 603 is pressed down, as shown in FIG. 7B an image of four pages laid out on one paper is displayed. Thus, by using the buttons on the screen, the number of pages displayed on one screen can be designated.

Note that, in the description that follows, one paper is represented as one page, not only when one page of document data is laid out on one paper, but also when a plurality of pages of document data are laid out on one paper. For example, when two pages of document data are laid out on one paper, the first page refers to the first sheet of paper on which the first and second pages of document data are laid out. The second page refers to the second sheet of paper on which the third and fourth pages of document data are laid out. In this embodiment, the operation panel 3000 generates a print job so that a result from printing by the main body 10000 is similar to that displayed on the operation panel 3000.

<Method of Determining Transition to "Transfer Mode"

Next, a method of determining whether to transition from the "browsing mode" to the "transfer mode" in step S304 in FIG. 3 will be described.

In this embodiment, by performing an operation so that the detection value of the three-dimensional acceleration sensor 3111 in the vicinity of the main body 10000 is greater than or equal to a predetermined value, the mode of the operation panel 3000 is transitioned from the "browsing mode" to the "transfer mode." For example, by lightly striking the operation panel 3000 against a portion of the main body 10000, or swinging the operation panel 3000 in the vicinity of the main body 10000, the mode of the operation panel 3000 is transitioned to the "transfer mode." In this case, the three-dimensional acceleration sensor 3111 is used to detect a collision or a shake.

Figure 8:
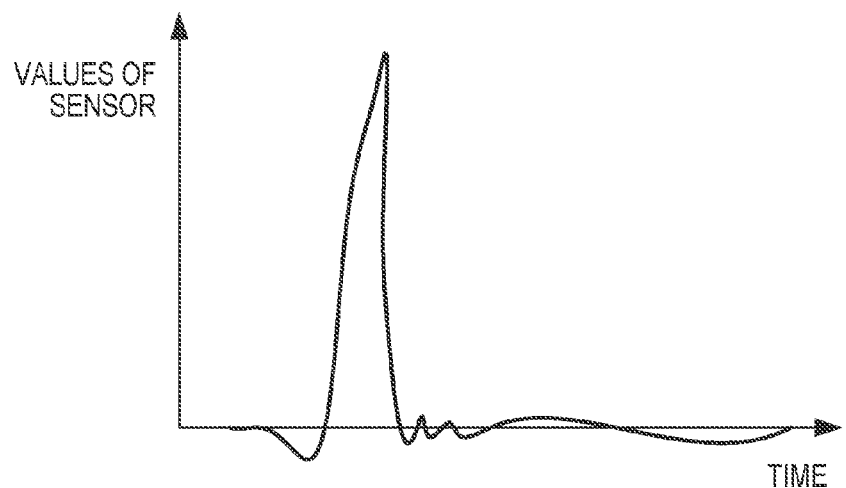
FIG. 8 is a diagram showing example detection values of a three-dimensional acceleration sensor which are obtained when the operation panel is lightly struck against the main body.

FIG. 8 is a diagram showing example detection values of the three-dimensional acceleration sensor 3111 of the operation panel 3000 which are obtained when the operation panel 3000 is lightly struck against the main body 10000.

As a result, the striking of the operation panel 3000 against something can be detected. However, if based on only the detection values of the three-dimensional acceleration sensor 3111, it cannot be determined whether the object struck by the operational panel 3000 is the main body 10000 or other objects. Therefore, in this embodiment, after the collision of the operation panel 3000 has been detected, it is determined whether or not there is an ad hoc target for wireless connection, and wireless connection is performed to negotiate with the main body 10000, thereby determining whether or not the operation panel 3000 has collided with the main body 10000.

Figure 9:
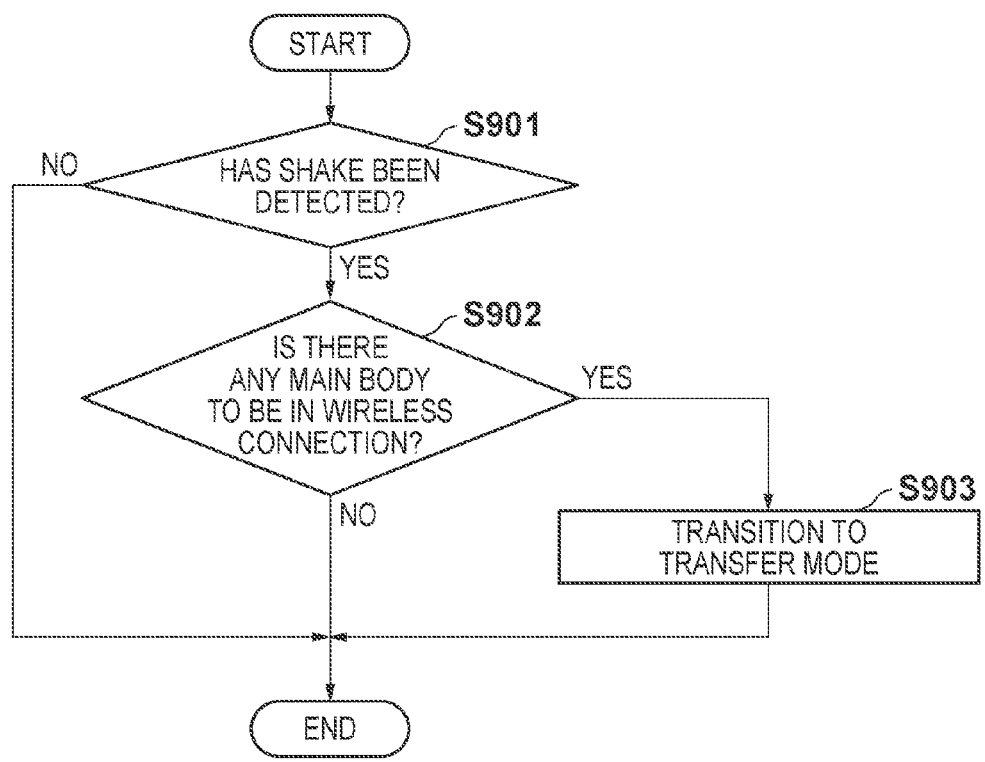
FIG. 9 is a flowchart for describing a process which is executed by the operation panel based on the detection value of the three-dimensional acceleration sensor.

FIG. 9 is a flowchart for describing a process which is executed by the operation panel 3000 based on the detection value of the three-dimensional acceleration sensor 3111. A program for executing this process is stored in the flash ROM 3107 and executed under control of the CPU 3101.

Initially, in step S901, based on the detection value of the three-dimensional acceleration sensor 3111, it is determined whether or not a shock or a shake due to the collision has been applied to the operation panel 3000. If it is determined that a shock or a shake has been applied, the process proceeds to step S902, in which it is determined whether or not the main body 10000 as a target for wireless connection is located in the vicinity of the operation panel 3000. This can be determined by comparing a position detected by the GPS 3113 with a position of the main body 10000 (previously registered) to determine whether or not the distance between these positions is smaller than or equal to a predetermined value. If it is determined that the main body 10000 as a target for wireless connection is located in the vicinity of the operation panel 3000, the process proceeds to step S903, in which the operation panel 3000 transitions to the "transfer mode."

Note that, instead of this method, there are various methods of determining whether or not the operation panel 3000 is located in the vicinity of the main body 10000. For example, by performing close proximity wireless communication using the irDA module 3103 included in the operation panel 3000 and the irDA module 2102 included in the home position 2000 of the main body 10000, it may be determined whether or not the operation panel 3000 is located in the vicinity of the main body 10000. Note that when the determination is performed using close proximity wireless communication, the distance between the operation panel 3000 and the main body 10000 is limited to the range which allows close proximity wireless communication.

<Method of Updating Display of Document Data in Transfer Mode>

Next, a method of updating display of document data in the "transfer mode" in step S309 in FIG. 3 will be described.

In this embodiment, when the operation panel 3000 transitions to the "transfer mode," a guide indicating a direction in which the operation panel 3000 should be inclined is laid on an image displayed on the display unit 3200.

Figure 10:
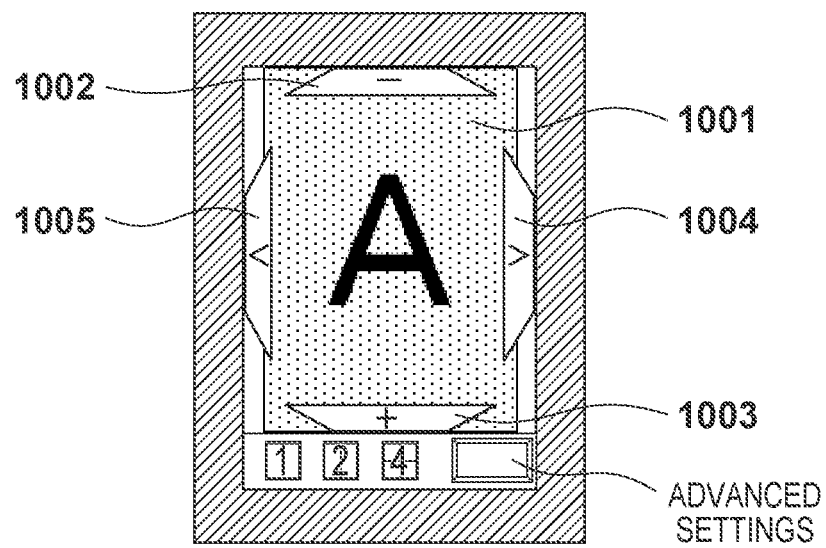
FIG. 10 is a diagram for describing a guide indicating a direction in which the operation panel should be inclined.

FIG. 10 is a diagram for describing the guide indicating a direction in which the operation panel 3000 of this embodiment should be inclined.

Reference numeral 1001 denotes an image of document data to be printed. Reference numerals 1002-1005 denotes guides for indicating of a direction of inclination. The guides 1002 and 1003 each indicate an inclination with reference to a side where the operation panel 3000 and the main body 10000 are connected to each other.

Figure 11:
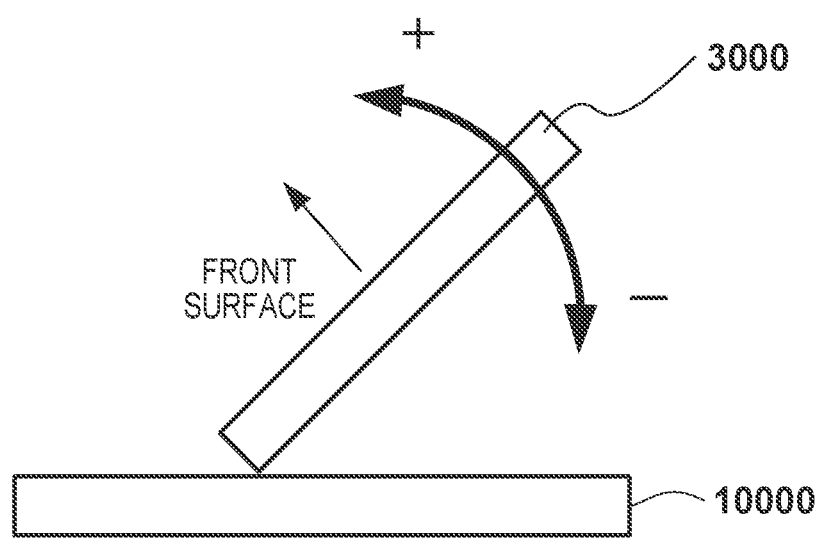
FIG. 11 is a diagram for describing an inclination in to and fro directions of the operation panel.

FIG. 11 is a diagram for describing an inclination in to and fro directions of the operation panel 3000, corresponding to the guides 1002 and 1003.

As shown in FIG. 11, a direction in which the operation panel 3000 is inclined in a front surface direction (raised) is defined as "+" (corresponding to the guide 1003), and a direction in which the operation panel 3000 is inclined in the opposite direction (lowered) is defined as "−" (corresponding to the guide 1002).

Figure 12A:
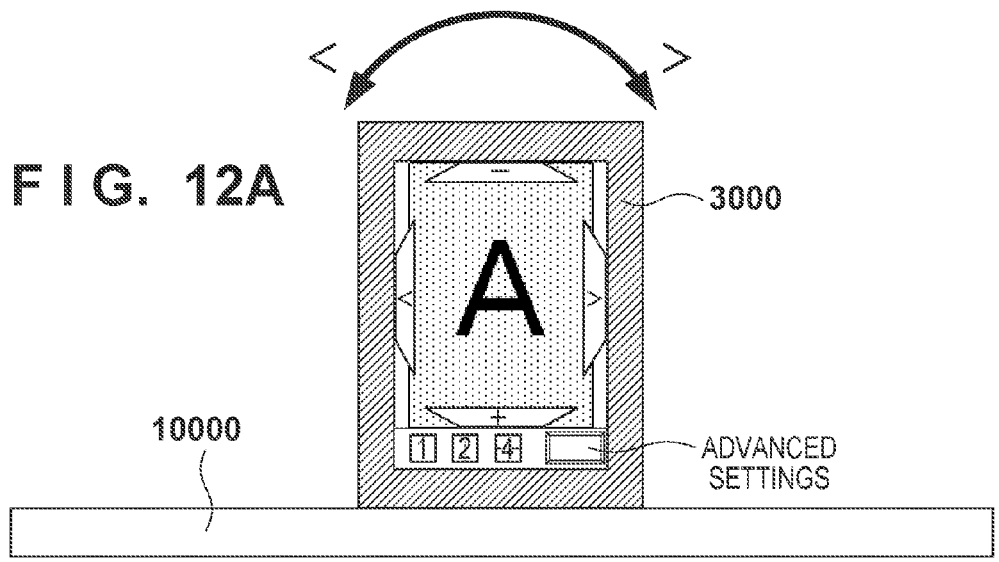
FIGS. 12A to 12C are diagrams for describing inclinations in left and right directions of the operation panel according to an embodiment.
Figure 12B:
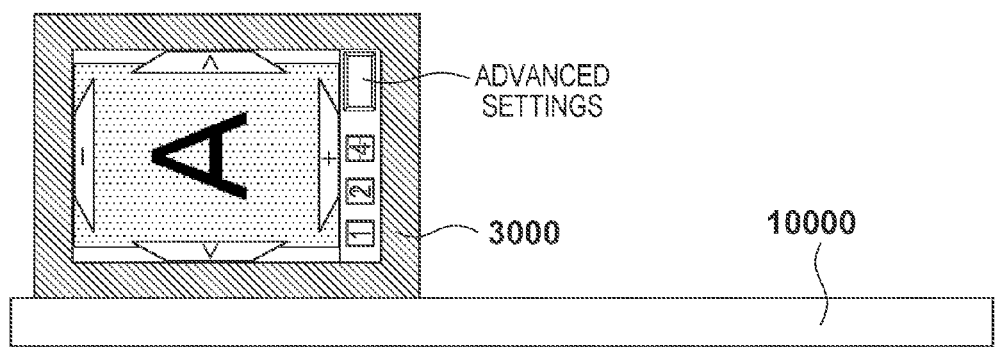
Figure 12C:
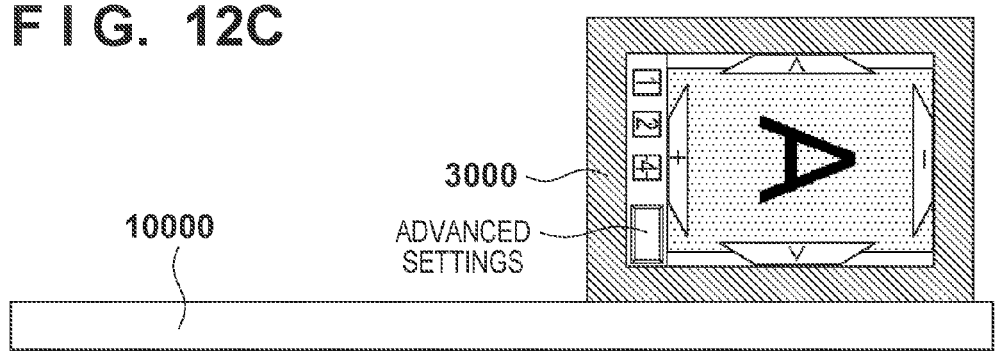

On the other hand, the guides 1004 and 1005 each indicate an inclination in left and right directions of the operation panel 3000 as shown in FIGS. 12A to 12C.

FIGS. 12A to 12C are diagrams for describing inclinations in left and right directions of the operation panel 3000 of the embodiment.

FIG. 12A is a diagram for describing an inclination in left and right directions of the operation panel 3000 relative to the main body 10000, where "<" (left) indicates that the operation panel 3000 is inclined leftward, and ">" (right) indicates that the operation panel 3000 is inclined rightward. These inclinations are detected by the three-dimensional gyro sensor 3112. FIG. 12B indicates the operation panel 3000 which is inclined leftward to a horizontal orientation relative to the main body 10000. FIG. 12C indicates the operation panel 3000 which is inclined rightward to a horizontal orientation relative to the main body 10000.

The operation panel 3000, when inclined in the directions described above, updates the display of an image on the display unit 3200 as follows:

An inclination in the "+" (positive) direction of FIG. 11 is detected.

The operation panel 3000 updates an image displayed on the display unit 3200 so that a page immediately following the current page is displayed.

FIGS. 13A to 13D are diagrams for describing example changing of display, depending on the inclination of the operation panel 3000.

Figure 13A:
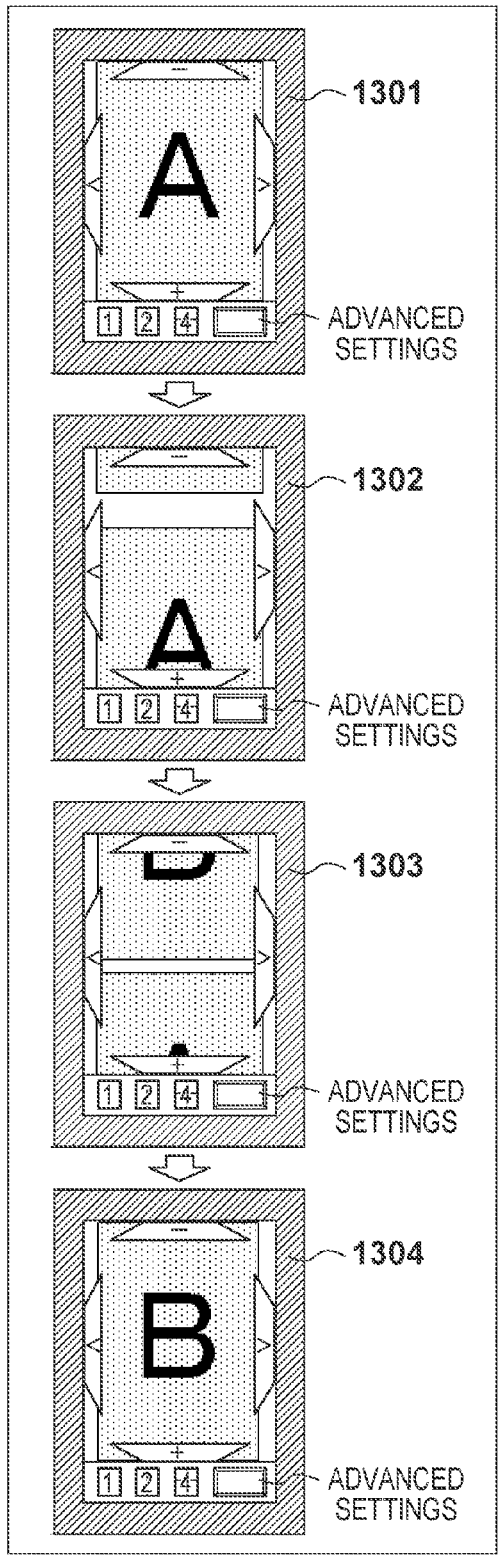
Figure 13B:
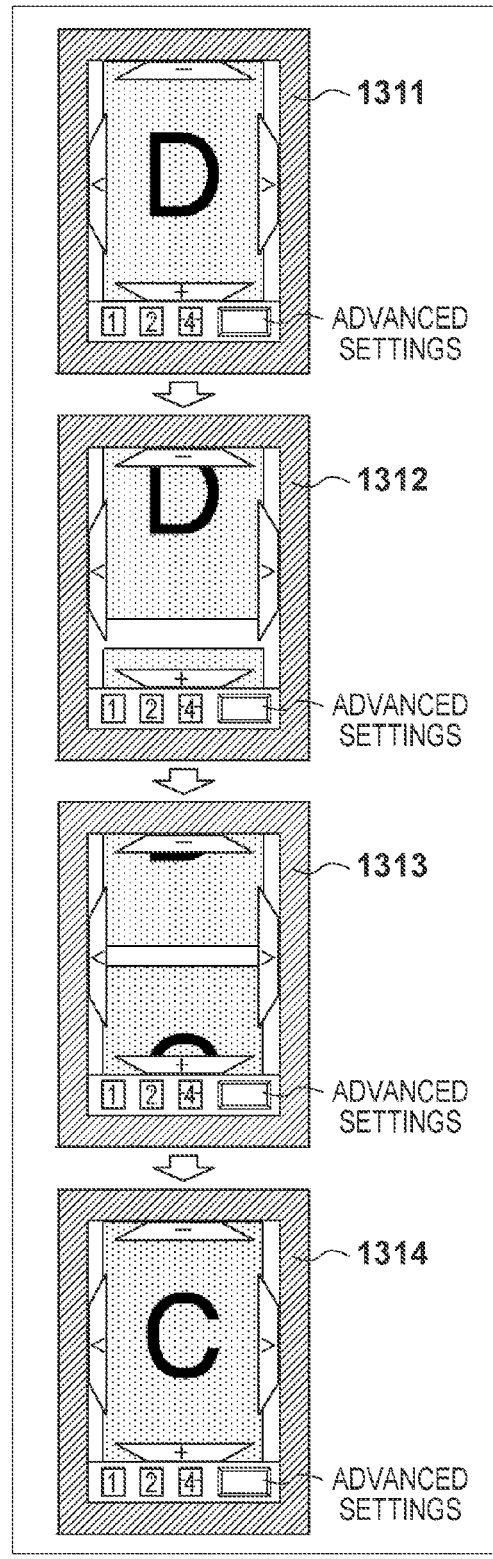

Reference numerals 1301-1304 of FIG. 13A denote changing of a display form which occurs when an inclination in the "+" (positive) direction of FIG. 11 has been detected. Specifically, the operation panel 3000 successively updates an image so that a page displayed in 1301 flows out downward in the screen, and the next page flows in from above the screen (in order of page). This image updating is continued as long as the operation panel 3000 is kept in an inclined position in the "+" (positive) direction until the final page flows out downward in the screen.

An inclination in the "−" (negative) direction of FIG. 11 is detected.

The operation panel 3000 updates an image displayed on the display unit 3200 so that a page immediately preceding the current page is displayed. Reference numerals 1311-1314 of FIG. 13B denote updating which is performed when an inclination in the "−" (negative) of FIG. 11 has been detected. Specifically, the operation panel 3000 successively updates an image so that a page displayed in 1311 flows out upward in the screen, and the previous page flows in from below the screen (in reverse order of page). This image updating is continued as long as the operation panel 3000 is kept in an inclined position in the "−" (negative) direction until the first page flows out upward in the screen.

An inclination in the ">" (right) direction of FIG. 12A is detected.

The operation panel 3000 displays reduced images of a page being displayed at the time of switching to the "transfer mode" and all pages following the page ("B," "C," and "D" in FIG. 13C). The operation panel 3000 successively updates the screen so that these reduced images flow out from the screen frame in an inclination direction (here, rightward). This means that a page being displayed at the time of switching to the "transfer mode" and all pages following that page are to be printed. Reference numerals 1321-1324 of FIG. 13C indicate this situation.

An inclination in the "<" (left) direction of FIG. 12A is detected.

The operation panel 3000 displays reduced images of a page being displayed at the time of switching to the "transfer mode" and all pages preceding that page ("C," "B," and "A" in FIG. 13D). The operation panel 3000 successively updates the screen so that these reduced images flow out from the screen frame in an inclination direction (here, leftward). This means that a page being displayed at the time of switching to the "transfer mode" and all pages preceding the page are to be printed. Reference numerals 1331-1334 of FIG. 13D indicate this situation. FIGS. 13C and 13D indicate a case in that total four pages "A" to "D" exist.

Note that when the changing of pages displayed on the display unit 3200 due to the inclination in the "+" (positive) or "−" (negative) direction of FIG. 11 has been completed, the updating of the screen may preferably be temporarily stopped. This is because it is easier for the user to determine whether or not to include a changed page into a group of pages to be printed.

When an inclination in the "+" (positive) or "−" (negative) direction as shown in FIG. 11 has been detected, an elapsed time from a state in which a page is displayed to a state in which the next page is displayed may be controlled to be inversely proportional to the magnitude (degree) of the inclination. In other words, as the inclination is increased, the updating time of page display is decreased. By such a control, the time required to display the next page increases as the inclination decreases, and conversely, the time required to display the next page decreases as the inclination increases, whereby the user's convenience is improved.

When an inclination in the ">" (right) or "<" (left) direction of FIG. 12A has been detected (FIGS. 13C and 13D), the operation panel 3000 determines that a page being displayed at the time of switching to the "transfer mode" and all pages preceding or following that page are to be printed. As a result, the user can quickly designate desired pages to be printed. Therefore, the user's convenience is improved.

<Method of Determining Whether to Start Printing of Document>

Next, a method of determining whether to start printing of document data in step S308 in FIG. 3 will be described. In this embodiment, when the operation panel 3000 and the main body 10000 are separated from each other by a predetermined distance, or when the updating of display of document data in the "transfer mode" is ended, it is determined to start transfer of the document data for printing. The distance between the operation panel 3000 and the main body 10000 can be measured by the GPS 3113 as described above. Alternatively, the three-dimensional acceleration sensor 3111 may be used to measure the distance. Specifically, after lightly striking the operation panel 3000 against the main body 10000 so that the operation panel 3000 transitions to the "transfer mode," the subsequent two detection values in the gravitational acceleration direction of the three-dimensional acceleration sensor 3111 are temporally integrated. As a result, the movement distance of the operation panel 3000 can be calculated based on the collision. By utilizing this, the distance between the operation panel 3000 and the main body 10000 can be measured (when the operation panel 3000 is struck against the main body 10000 in the gravitational acceleration direction).

As described above, when an inclination in the "+" (positive) or "−" (positive) direction (FIG. 11) is detected, pages displayed on the display unit 3200 are changed, depending on the inclination. The print range of document data in this case is from a page which is being displayed at the time of switching of the mode of the operation panel 3000 to the "transfer mode" to a page immediately preceding a page which is being displayed at the time of determination to start transfer of document data. Specifically, the range of document data designated by a print instruction is from the N-th page to the (M−1)th page (where N<M) or from (M−1)th page to the N-th page (where N>M), where N is the page number of a page which is being displayed at the time of switching of the mode of the operation panel 3000 to the "transfer mode," and M is a page which is being displayed at the time of determination to start transfer of document data. When N=M, it is determined that there is no page to be printed, and no print job is transferred from the operation panel 3000 to the main body 10000. When the transfer of a print job is completed and the transfer mode is switched to the "browsing mode," the operation panel 3000 displays the M-th page. As a result, the user can resume operation from a page (M-th page) which has not been printed, in the "browsing mode," and therefore, the convenience is improved.

As described above, according to the first embodiment, the operation panel 3000 which can wirelessly communicate with the main body 10000 and has an inclination sensor, can designate a print range, depending on the inclination of the operation panel 3000, an input instruction to the touch panel 3300, etc. As a result, the operability can be improved.

The operation panel 3000 identifies a main body (printing apparatus) 10000 to which the operation panel 3000 is to transmit a print job, depending on the detection result of the three-dimensional acceleration sensor 3111. Therefore, the user can designate an apparatus to which a print job is to be transmitted, by lightly striking the operation panel 3000 against the printing apparatus, for example. As a result, the operability can be improved.

The operation panel 3000 has the "browsing mode" and the "transfer mode." In the "transfer mode," a guide indicating a direction in which the operation panel 3000 should be inclined is displayed, and the display of a page is updated, depending on the inclination in the direction. As a result, the operability can be improved.

Document data can be displayed in a layout for multiple-pages-per-sheet printing (for example, 2 in 1) on the operation panel 3000. Based on the display, a print instruction (that is, a print job) can be issued. Therefore, the page range can be designated in a user-friendly manner when multiple-pages-per-sheet printing is performed. As a result, the operability can be improved.

<Second Embodiment>

In the first embodiment, the operation panel 3000 transmits to the main body 10000 a print job which designates document data and a page range to be printed, irrespective of the print range. In contrast to this, in the second embodiment, a case where image data rasterized by the operation panel 3000 is transferred to the main body 10000 instead of document data will be described.

Figure 14:
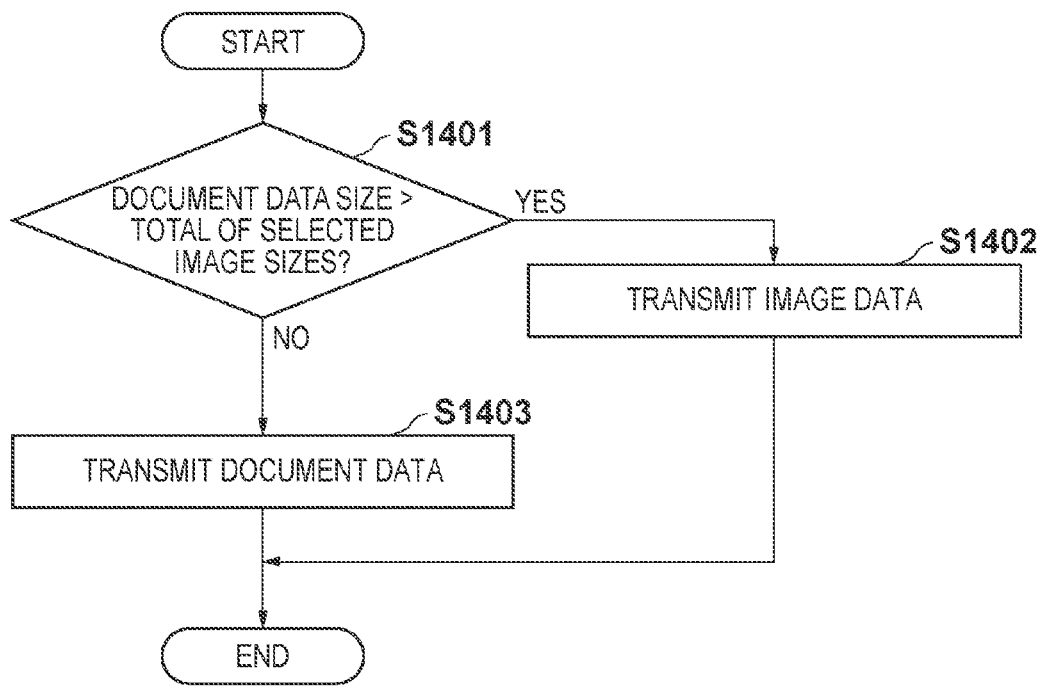
FIG. 14 is a flowchart for describing a process of selecting transfer data according to a second embodiment.

FIG. 14 is a flowchart for describing a process of selecting transfer data according to the second embodiment. Note that parts, such as an image forming apparatus main body 10000, an operation panel 3000, and the like, of the second embodiment are the same as those of the first embodiment and will not be described.

After a print range is designated, in step S1401 the operation panel 3000 compares the total value of sizes of pieces of designated image data with the size of document data. Here, the magnitude of an image size means the size of a compressed version of image data which is obtained by rasterizing document data in the operation panel 3000. If the total value of image sizes is smaller than the size of the document data, the process proceeds to step S1402, in which the operation panel 3000 transfers the compressed image data to the main body 10000. On the other hand, if the total value of image sizes is greater than the size of document data, the process proceeds to step S1403, in which, as in the first embodiment described above, the document data is transferred to the main body 10000.

As a result, the size (quantity) of data to be transferred from the operation panel 3000 to the main body 10000 can be reduced, whereby the printing process can be sped up.

<Third Embodiment>

In the above embodiments, data is transmitted after a print range has been selected. In the third embodiment, document data is transmitted before a print range has been selected. Note that parts, such as an image forming apparatus main body 10000, an operation panel 3000, and the like, of the third embodiment are the same as those of the first embodiment and will not be described.

Figure 15:
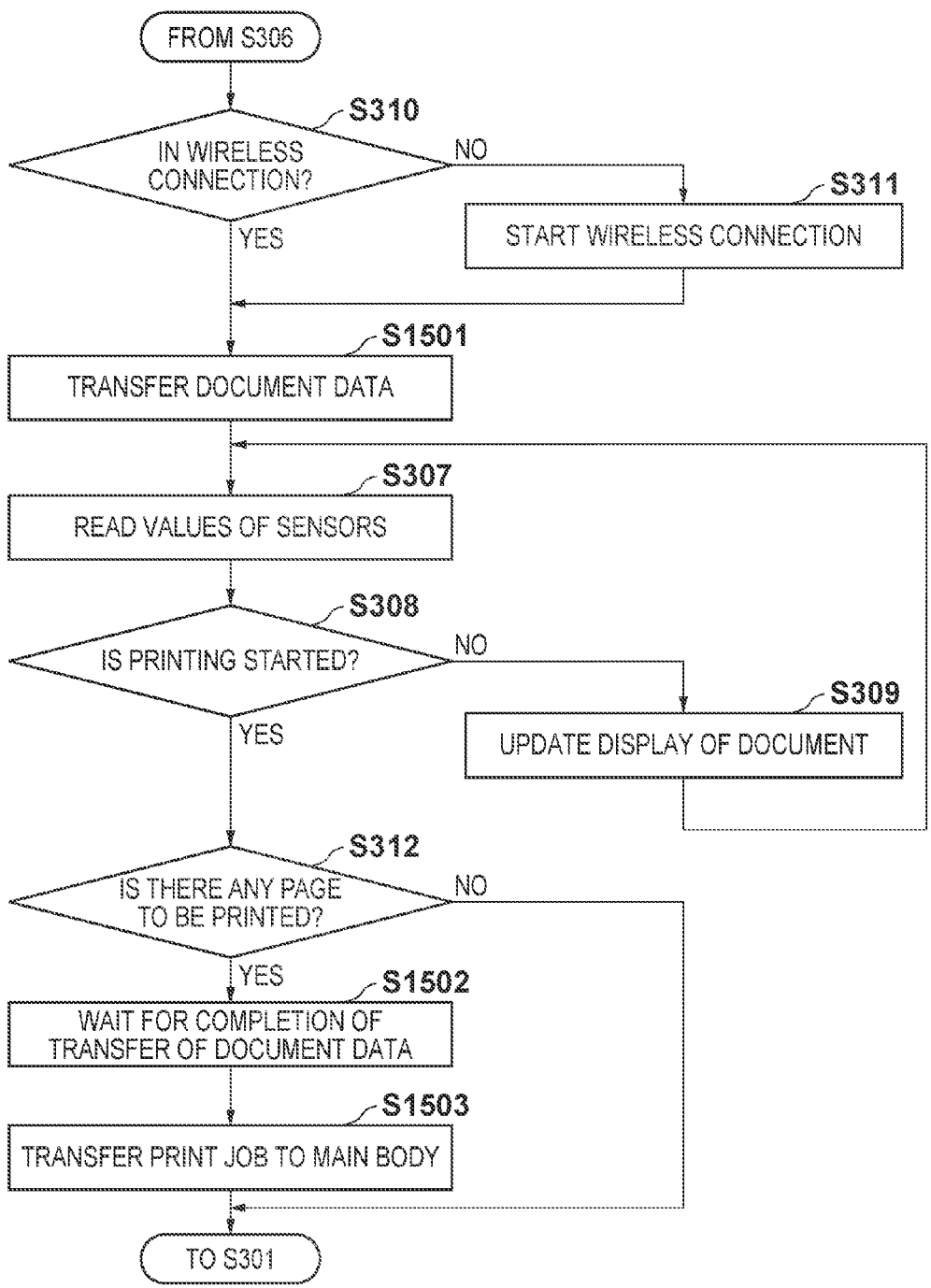
FIG. 15 is a flowchart for describing a process according to a third embodiment.

FIG. 15 is a flowchart for describing a process according to the third embodiment. Note that the same steps as those of the flowchart of FIG. 3 are indicated by the same reference characters. A program for executing this process is stored in the flash ROM 3107, and is executed under control of the CPU 3101.

In the third embodiment, after the mode is switched to the "transfer mode" in step S306, in step S310 the CPU 3101 determines whether or not the main body 10000 is in wireless connection therewith. Here, if the determination result is positive, the process proceeds to step S1501. Otherwise, the process proceeds to step S311, in which wireless connection is started, and thereafter, the process proceeds to step S1501. In step S1501, document data is transferred to the main body 10000 via wireless communication. Here, the transferred document data is stored into the HDD 14000 of the main body 10000. Thereafter, the process of step S307 is performed without waiting for completion of the transfer of the document data. Thereafter, in step S312, it is determined whether or not there is a page(s) to be printed. If there is a page(s) to be printed, the process proceeds to step S1502, in which the CPU 3101 waits for completion of transmission of document data which has been started in step S1501. Thereafter, the process proceeds to step S1503, in which a print job designating the address of document data stored in the HDD 14000 of the main body 10000 and the print range of document data determined in step S308 is transmitted to the main body 10000.

As described above, according to the third embodiment, transmission of document data to be printed is started in step S1501 immediately after the mode is switched to the "transfer mode" in step S306. Therefore, transmission of document data and designation of a print range can be performed in parallel. As a result, a printing process can be performed at high speed.

(Other Embodiments)

In the above embodiments, when the operation panel 3000 and the main body 10000 are separated from each other by a predetermined distance, or when updating of display of document data in the "transfer mode" is ended, transfer of the document data is started. However, the present invention is not limited to this. For example, the CPU 3101 of the operation panel 3000 may start transfer of document data in response to detecting that the screen of the operation panel 3000 is pressed down using a finger while the display is being updated as shown in FIG. 13A. For example, in the case of the example of FIG. 13A, as the operation panel 3000 is inclined in the "+" direction, the CPU 3101 changes the display 1301 to the display 1302, and then the display 1302 to the display 1303. Here, when the user presses down the touch panel 3300 of the operation panel 3000 using a finger, the CPU 3101 detects the pressing down of the touch panel 3300, and stops the updating of the display. Thereafter, the process proceeds from step S308 to step S310, and executes the processes of step S310 in FIG. 3 and the following steps in FIG. 3. As a result, the user can prevent an image which the user does not want to print from being printed, by stopping an image flowing out using a finger (that is, an intuitive operation). Alternatively, the CPU 3101 may detect the pressing down of the touch panel 3300, and when the operation panel 3000 and the main body 10000 are separated from each other at a predetermined distance, may transition from step S308 to step S310, and perform the process of S310 and the following steps in FIG. 3. Alternatively, the CPU 3101 may detect the pressing down of the touch panel 3000, and when the display of document data in the "transfer mode" has been updated, may transition from step S308 to step S310, and perform the process of step S310 and the following steps in FIG. 3.

In the first embodiment, an example has been described in which after the operation panel 3000 determines a print range by the processes of steps S307 to S309, a print job is transmitted to the main body 10000 in step S313 only after it is determined in step S308 that printing is to be started. However, the present invention is not limited to this. For example, the operation panel 3000 may generate and transmit a print job to the main body 10000 for each page while updating the display of a document by the process of step S309. For example, as shown in FIG. 13A, as the operation panel 3000 is inclined in the "+" direction so that the display 1301 is changed through the display 1302 and the display 1303 to the display 1304, a job for printing an image containing "A" may be generated and transmitted to the main body 10000. The same applies to the examples of FIGS. 13B-13D. Thus, the CPU 3101 of the operation panel 3000, when the operation panel 3000 is inclined, updates the display so that image data being displayed flows out, depending on the direction of the inclination. Thereafter, the CPU 3101 of the operation panel 3000 generates a print job for a page(s) which has flowed out from the screen due to the updating of the display, and transmits the generated print job to the main body 10000. As a result, while the display is updated, each page is printed by the main body 10000 as appropriate. Note that if the operation panel 3000 is inclined in the opposite direction while a page is being updated, a previous page is displayed. For example, when the operation panel 3000 is inclined in the "+" direction, the display 1301 is changed through the display 1302 to the display 1303. Thereafter, when the operation panel 3000 is inclined in the "−" direction, the display 1303 is changed through the display 1302 to the display 1301. In this case, the image containing "A" has not flowed out from the screen of the operation panel 3000, and therefore, is not printed.

Note that, also in such a control, the CPU 3101 may perform a control so that updating of display is stopped when detecting pressing down of the touch panel 3300. As a result, the user can prevent an image which the user does not want to print from being printed, by stopping an image flowing out using a finger (that is, an intuitive operation).

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-281016 filed Dec. 16, 2010 and No. 2011-261010 filed Nov. 29, 2011, which are hereby incorporated by reference herein in their entirety.

The invention claimed is:

1. An information processing apparatus for transmitting a print job to a printing apparatus, comprising:
    display means for displaying document data;
    detection means for detecting an inclination of the information processing apparatus;
    instruction means for providing an instruction to transmit the document data to be printed to the printing apparatus;
    decision means for deciding the document data to be printed from the document data of a plurality of pages, based on the inclination of the information processing apparatus detected by the detection means; and
    transmission means for transmitting to the printing apparatus the document data to be printed decided by the decision means, in response to the instruction provided by the instruction means.

2. The information processing apparatus of claim 1, further comprising:
    collision detection means for detecting a collision between the printing apparatus and the information processing apparatus,
    wherein the instruction means provides the instruction to transmit the document data to be printed to the printing apparatus, based on the detection by the collision detection means.

3. The information processing apparatus of claim 1, further comprising:
    shake detection means for detecting application of a shake having a first predetermined value or more to the information processing apparatus; and
    determination means for determining whether or not a distance between the information processing apparatus and the printing apparatus is a second predetermined value or less when the shake detection means has detected the shake having the first predetermined value or more,
    wherein the instruction means provides the instruction to transmit the document data to be printed to the printing apparatus, in a case that the determination means has determined that the distance between the information processing apparatus and the printing apparatus is the second predetermined value or less.

4. The information processing apparatus of claim 1, wherein the information processing apparatus has a first operating mode for browsing the document data and a second operating mode for designating the document data to be printed,
    in the first operating mode, a page or the pages of the document data are displayed on the display means in order of page or in reverse order of page, depending on whether the information processing apparatus is inclined backward or forward, and
    the decision means decides, in the second operating mode, whether the page of the document data to be printed is set to a page preceding a currently displayed page or a page following the currently displayed page, depending on whether the information processing apparatus is inclined in a right direction or in a left direction, to display the page of the document data to be printed on the display means.

5. The information processing apparatus of claim 1, further comprising:
    designation means for designating a number of pages of the document data to be printed on one sheet of paper; and
    display control means for changing a layout of a page or the pages of the document data to be displayed on the display means, depending on the number of pages designated by the designation means.

6. The information processing apparatus of claim 4, further comprising:
    means for changing a time required to update each page displayed on the display means, depending on a magnitude of the inclination of the information processing apparatus detected by the detection means.

7. A method for controlling an information processing apparatus which includes a display unit for displaying document data and transmits a print job to a printing apparatus, comprising:

a detection step of detecting an inclination of the information processing apparatus;

an instruction step of providing an instruction to transmit the document data to be printed to the printing apparatus;

a decision step of deciding the document data to be printed from the document data of a plurality of pages, based on the inclination of the information processing apparatus detected in the detection step; and a transmission step of transmitting to the printing apparatus the document data to be printed decided in the decision step, in response to the instruction provided in the instruction step.

* * * * *